United States Patent
Codilian et al.

(10) Patent No.: US 6,661,597 B1
(45) Date of Patent: Dec. 9, 2003

(54) MOBILE DEVICE AND DISK DRIVE RESTRICTED FROM WRITING A DATA STORAGE ZONE IN A MOBILE ENVIRONMENT

(75) Inventors: Raffi Codilian, Irvine, CA (US); Anil Sareen, Mission Viejo, CA (US); Thomas D. Hanan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/846,843

(22) Filed: Apr. 30, 2001

(51) Int. Cl.⁷ .................................................. G11B 5/09
(52) U.S. Cl. .............................. 360/75; 360/69; 360/48; 360/60; 710/303
(58) Field of Search .............................. 360/31, 53, 46, 360/69, 75, 48, 60; 369/44.27; 455/550, 556; 710/303; 711/111, 112

(56) References Cited

U.S. PATENT DOCUMENTS 5,761,460 A * 6/1998 Santos et al. ................. 62/3.2
6,437,947 B1 * 8/2002 Uno ............................ 369/126
6,504,663 B2 * 1/2003 Hirano et al. ............ 369/275.3

* cited by examiner

Primary Examiner—Andrew L. Sniezek
Assistant Examiner—Glenda P Rodriguez
(74) Attorney, Agent, or Firm—Milad G. Shara, Esq.; Robroy R. Fawcett, Esq

(57) ABSTRACT

The invention may be embodied in a disk drive for use in a mobile device. The mobile device may be a hand held computing device such as a personal digital assistant (PDA) or a mobile terminal such as a cellular telephone. The mobile device includes a host processor for accessing data on the disk drive. The disk drive has a rotating disk media and a moveable read/write head disposed over the disk media. The disk media is divided into a first data storage zone and a second data storage zone. The data storage zones are radially disposed in discrete areas of the disk media and each zone has a plurality of tracks for storing data. The mobile device may write data to the first data storage zone when the mobile device is in a mobile environment. The mobile device may write data to the second data storage zone only when the mobile device is in a non-mobile environment and may not write data to the second data storage zone when the mobile device is in a mobile environment.

22 Claims, 2 Drawing Sheets

MOBILE DEVICE AND DISK DRIVE RESTRICTED FROM WRITING A DATA STORAGE ZONE IN A MOBILE ENVIRONMENT

BACKGROUND OF THE INVENTION

1. Field of the Invention

The present invention relates to digital data storage, and more particularly, to a hard disk drive for use in a mobile device.

2. Description of the Prior Art

A hard disk drive provides digital data storage on a magnetic media that is accessed using a flying head that precisely floats over the media. Use of a hard disk drive in a hand-held portable device is generally problematic because the device may be subjected to fairly high shock levels. A shock delivered to the disk drive may cause the head to contact or "slap" the disk media surface or cause the head to move off track and damage adjacent track data during a write operation.

Accordingly, there exists a need for a relatively rugged disk drive for use in a mobile device. The present invention satisfies these needs.

SUMMARY OF THE INVENTION

The present invention may be embodied in a disk drive for use in a mobile device. The mobile device includes a host processor that accesses data on the disk drive. The disk drive has a rotating disk media and a moveable read/write head disposed over the disk media. The disk media is divided into first and second data zones that are radially disposed in discrete areas of the disk media and that each has a plurality of tracks for storing data. The mobile device may write data to the first data storage zone when the mobile device is in a mobile environment. The mobile device may write data to the second data storage zone only when the mobile device is in a non-mobile environment and may not write data to the second data storage zone when the mobile device is in a mobile environment.

In more detailed features of the invention, the mobile device is in a non-mobile environment when the mobile device is placed in a docking station and the mobile device is in a mobile environment when the mobile device is not placed in a docking station. The first data storage zone may include a mobile-safe zone and a mobile-normal zone. The mobile-safe zone may have a track pitch that is wider than a track pitch of the mobile-normal zone. Alternatively, the mobile device may write data to adjacent tracks of the mobile normal zone, and may not write data to adjacent tracks of the mobile-safe zone. The second data storage zone may include an ultra-safe zone and a docked-safe zone, and the first data storage zone may include a mobile-safe zone and a mobile-normal zone. The mobile device may read data from the ultra-safe zone only when the mobile device is in a non-mobile environment, and may read data from the docked-safe zone when the mobile device is in a mobile environment or is in a non-mobile environment. The disk drive may prevent the moveable read/write head from dwelling or moving over the ultra-safe zone when the device is in a mobile environment. The mobile-safe zone also may have a track pitch that is wider than a track pitch of the docked-safe zone and/or the ultra-safe zone.

In other more detailed features of the invention, the disk drive includes a ramp for parking an actuator arm coupled to the read/write head when the disk drive is in a spin-down mode. The disk drive may include a mobile-low-power zone that is located on the disk media so that an actuator current is minimized for moving the read/write head to a data track in the mobile-low-power zone upon loading of the read/write head over the disk media from the ramp. A distance from an outer diameter of the disk media to the mobile-low-power zone may be between about 10 and 15 percent of a distance between the outer diameter and an inner diameter of the disk media.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
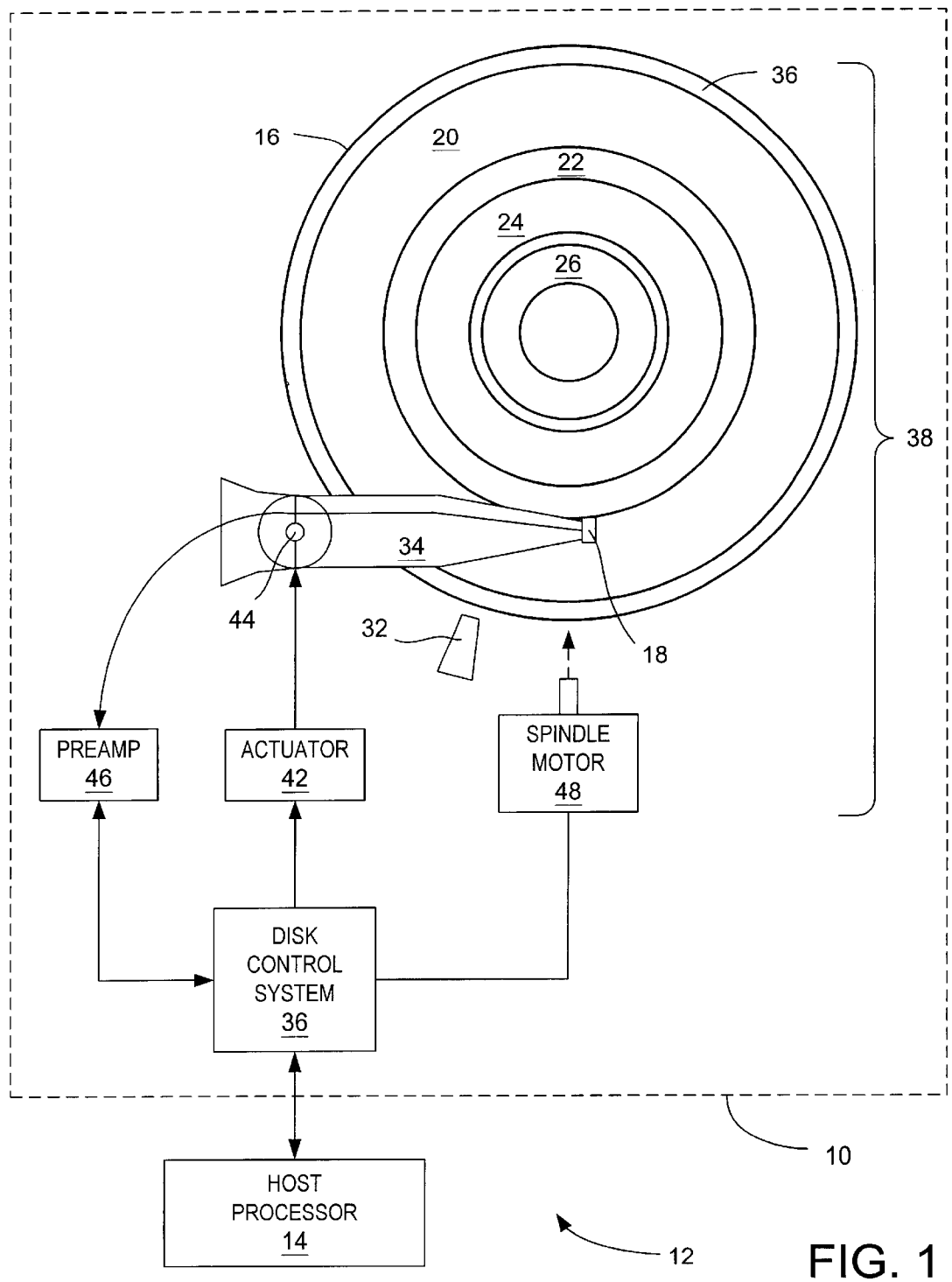
FIG. 1 is a block diagram of a mobile device having a disk drive with a data storage zone that is restricted from writing while the device is in a mobile environment, according to the present invention.

With reference to FIG. 1, the present invention may be embodied in a disk drive 10 for use in a mobile device 12. The mobile device may be a hand held computing device such as a personal digital assistant (PDA) or a mobile terminal such as a cellular telephone. The mobile device includes a host processor 14 for accessing data on the disk drive. The disk drive 10 has a rotating disk media 16 and a moveable read/write head 18 disposed over the disk media. The disk media is divided into a first data storage zone, 20, 22, and a second data storage zone, 24, 26. The data storage zones are radially disposed in discrete areas of the disk media and each zone has a plurality of tracks for storing data. The mobile device may write data to the first data storage zone when the mobile device is in a mobile environment. The mobile device may write data to the second data storage zone only when the mobile device is in a non-mobile environment and may not write data to the second data storage zone when the mobile device is in a mobile environment.

Enforcement of rules for accessing data storage zones according to whether the mobile device 12 and disk drive 10 are in a mobile environment can be implemented in a program executed by the mobile device host processor 14, by a program executed by a disk drive microprocessor within disk control system 36, or by a combination of both. For example, the disk drive 10 can be manufactured with a program which defines rules for mobile access of specific zones, and the host program can inform the disk drive of whether the environment is mobile or not. This could be determined by a signal from a docking station 28 (FIG. 2 below) to the mobile device 12, or by monitoring a signal indicating the presence of AC power. In another embodiment, the signal can be detected by logic within the disk drive 10.

Figure 2:
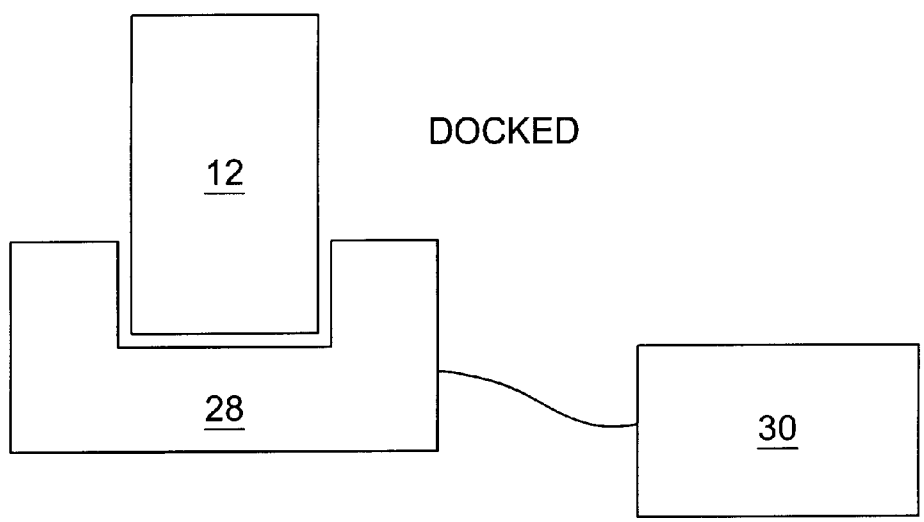
FIG. 2 is a block diagram showing a mobile device having a restricted-zone disk drive according to the present invention, placed in a docking station that provides a non-mobile environment for the mobile device.
Figure 3:
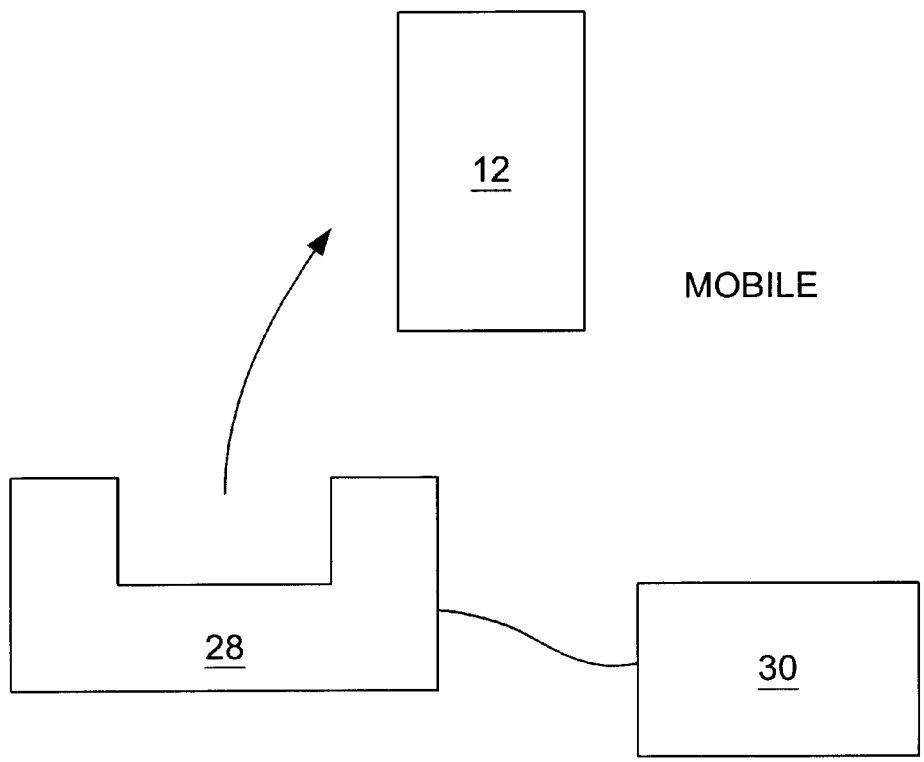
FIG. 3 is a block diagram showing a mobile device having a restricted zone disk drive according to the present invention, in a mobile environment removed from the docking station.

With reference to FIGS. 2 and 3, the mobile device is in a non-mobile environment when the mobile device 12 is placed in a docking station 28 (FIG. 2) and is in a mobile environment when the mobile device is removed from the docking station (FIG. 3). The mobile environment can be harsh on the mobile device subjecting it to fairly high shock levels. These high shock levels may affect the integrity of the data stored on the disk drive. Accordingly, data requiring a higher level of integrity may be stored in the second data storage zone and may be written to the second data storage zone only when the device is docked for charging, data transfer, or synchronization with a stationary computer 30 or with another computing device.

The first data storage zone may include a mobile-safe zone 22 and a mobile-normal zone 20. The mobile-safe zone may have a track pitch that is wider than a track pitch of the mobile-normal zone and/or the second data storage zone. In accordance with the wider track pitch in the mobile-safe zone, a servo control system in the disk drive 10 may modify certain parameters of its servo algorithms such as adjusting the granularity of analog to digital conversions for servo burst patterns to reflect the track spacing, or employing a larger "write unsafe" limit that allows the disk drive to more safely and successfully write data while the device in the mobile environment. Later, when the mobile device 12 is docked, the mobile written data may be transferred to the second data storage zone or to the stationary computer 30. The wider track pitch for the mobile safe zone may be accomplished by increasing the track pitch of the mobile-safe zone with respect to the other data storage zones. The varied track pitches may be accomplished using a disk drive disclosed in U.S. Pat. No. 6,052,250 titled DISK DRIVE WITH SEPARATELY DETERMINED SERVO AND DATA TRACK PITCH. U.S. Pat. No. 6,050,250 is incorporated herein in its entirety by reference.

Alternatively, the mobile device 12 may skip tracks in the mobile-safe zone 22 and use the larger write unsafe limit to allow the disk drive 10 to more safely write data when in the mobile environment. The skipping of data tracks may be accomplished using a technique disclosed in U.S. Pat. No. 6,452,896 [application Ser. No. 09/728,627 filed Nov. 30, 2000] titled METHOD FOR MINIMIZING ADJACENT TRACK DATA LOSS DURING A WRITE OPERATION IN A DISK DRIVE. U.S. Pat. No. 6,462,896 [application Ser. No. 09/728,627] is incorporated herein in its entirety by reference.

The second data storage zone may include an ultra-safe zone 26 and a docked-safe zone 24. The mobile device may read data from the ultra-safe zone only when the mobile device is in a non-mobile environment and not when the mobile device is in a mobile environment. The mobile device may read data from the docked-safe zone when the mobile device is in a mobile environment or when the mobile device is in a non-mobile environment. The disk drive may prevent the moveable read/write head from dwelling or moving over the ultra-safe zone when the device is in a mobile environment. The ultra-safe zone and the docked-safe zone may be separated by a gap. As mentioned before, the mobile-safe zone 22 may have a track pitch that is wider than a track pitch of the ultra-safe zone or the docked-safe zone.

The disk drive 10 includes a ramp 32 for parking an actuator arm 34 coupled to the read/write head 18 when the disk drive is in a spin-down mode. The disk drive may include a mobile-low-power zone 36 that is located on the disk media such that an actuator current is minimized for moving the read/write head to a data track in the mobile-low-power zone upon loading of the read/write head over the disk media 16 from the ramp. The mobile-low-power zone may have data read from but may not have data written to it when the mobile device is in a mobile environment. A distance from an outer diameter of the disk media to the mobile-low-power zone is between about 10 and 15 percent of a distance between the outer diameter and an inner diameter of the disk media.

The disk drive 30 includes a disk control system 36 and a head disk assembly (HDA) 38. The HDA includes a magnetic disk having the disk media 16 with the plurality of concentric data tracks recorded thereon, the head 18 for writing user data to or reading user data from a selected one of the data tracks in response to host command during a user operation of the disk drive, and an actuator 42 for positioning the head over the selected track. The head 18 in present disk drives comprises a giant magneto-resistive (GMR) read element and thin film inductive write element. The actuator is typically implemented as a voice coil motor (VCM) which rotates the actuator arm 34 about a pivot 44 in order to position the head radially over the disk in response to control signals from the disk control system. The HDA 44 also includes a preamplifier 46 and a spindle motor 48 for rotating the disk. The head communicates with the disk control system via the preamplifier. The disk control system also includes circuitry and processors that provide an intelligent disk control system interface between the host processor 14 and the HDA for execution of read and write commands.

The disk control system 36 implements a servo control loop which causes the head 18 to follow a centerline of the selected track in an operation generally referred to as "track following." During track following, the path of the head wanders about a track centerline. Typically, the disk control system attempts to limit the head wander to within a predetermined range defined by a "Track Misregistration" (TMR) budget. The TMR budget for the mobile-safe zone 22, with the wider track pitch, may be larger than the TMR budget for the other zones and thus the write unsafe limit of the mobile-safe zone may be larger.

It is contemplated that the ultra-safe zone 26 may be relatively small for holding very secure data such as passwords or the like. The data in the ultra-safe zone may be mirrored in the mobile-readable zones for mobile access. The docked-safe zone 24 may be a medium-sized zone for data requiring a relatively high integrity such as schedules, presentations, etc. If changes to data in a docked-safe zone are required in a mobile environment, a copy may be made in a mobile zone, and changed accordingly. When the device is docked, the docked-safe copy may be updated and the mobile copy deleted. The mobile-safe zone 22 may be a small-sized zone for holding relatively high integrity data that can be used to update the docked-safe zone when the device is docked. The mobile normal zone 20 may be a large-sized zone for holding data of relatively low important such as data from games or web surfing. The low-power zone 36 may be a small-sized zone for storing data requiring a low amount of energy to access.

We claim:

1. A mobile device comprising a host processor and a disk drive, the disk drive having a rotating disk media and a moveable read/write head disposed over the disk media, the disk media being divisible into zones that are radially disposed in discrete areas of the disk media, each zone having a plurality of tracks for storing data, the disk drive comprising:

a first data storage zone, wherein the mobile device may write data to the first data storage zone when the mobile device is in a mobile environment; and a second data storage zone, wherein the mobile device may write data to the second data storage zone only when the mobile device is in a non-mobile environment and may not write data to the second data storage zone when the mobile device is in a mobile environment.

2. A mobile device as defined in claim 1, wherein the mobile device is in a non-mobile environment when the mobile device is placed in a docking station and the mobile device is in a mobile environment when the mobile device is not placed in a docking station.

3. A mobile device as defined in claim 1, wherein:
the second data storage zone includes an ultra-safe zone and a docked-safe zone;
the mobile device may read data from the ultra-safe zone only when the mobile device is in a non-mobile environment and not when the mobile device is in a mobile environment; and
the mobile device may read data from the docked-safe zone when the mobile device is in a mobile environment or when the mobile device is in a non-mobile environment.

4. A mobile device as defined in claim 3, wherein the disk drive prevents the moveable read/write head from dwelling over the ultra-safe zone when the device is in a mobile environment.

5. A mobile device as defined in claim 3, wherein the disk drive prevents the moveable read/write head from moving over the ultra-safe zone when the device is in a non-mobile environment.

6. A mobile device as defined in claim 1, wherein the first data storage zone includes a mobile-safe zone and a mobile-normal zone, and the mobile-safe zone has a track pitch that is wider than a track pitch of the mobile-normal zone.

7. A mobile device as defined in claim 1, wherein:
the disk drive includes a ramp for parking an actuator arm coupled to the read/write head when the disk drive is in a spin-down mode; and
the disk drive includes a mobile-low-power zone that is located on the disk media so that an actuator current is minimized for moving the read/write head to a data track in the mobile-low-power zone upon loading of the read/write head over the disk media from the ramp.

8. A mobile device as defined in claim 7, wherein a distance from an outer diameter of the disk media to the mobile-low-power zone is between about 10 and 15 percent of a distance between the outer diameter and an inner diameter of the disk media.

9. A mobile device comprising a host processor and a disk drive, the disk drive having a rotating disk media and a moveable read/write head disposed over the disk media, the disk media being divisible into zones that are radially disposed in discrete areas of the disk media, each zone having a plurality of tracks for storing data, the disk drive comprising:
a first data storage zone, wherein the mobile device may write data to the first data storage zone when the mobile device is in a mobile environment, wherein the first data storage zone includes a mobile-safe zone and a mobile-normal zone, the mobile device may write data to adjacent tracks of the mobile normal zone, and the mobile device may not write data to adjacent tracks of the mobile-safe zone; and
a second data storage zone, wherein the mobile device may write data to the second data storage zone only when the mobile device is in a non-mobile environment and may not write data to the second data storage zone when the mobile device is in a mobile environment.

10. A mobile device comprising a host processor and a disk drive, the disk drive having a rotating disk media and a moveable read/write head disposed over the disk media, the disk media being divisible into zones that are radially disposed in discrete areas of the disk media, each zone having a plurality of tracks for storing data, the disk drive comprising:
a first data storage zone, wherein the mobile device may write data to the first data storage zone when the mobile device is in a mobile environment; and
a second data storage zone, wherein the mobile device may write data to the second data storage zone only when the mobile device is in a non-mobile environment and may not write data to the second data storage zone when the mobile device is in a mobile environment, wherein:
the second data storage zone includes an ultra-safe zone and a docked-safe zone, and the first data storage zone includes a mobile-safe zone and a mobile-normal zone;
the mobile device may read data from the ultra-safe zone only when the mobile device is in a non-mobile environment;
the mobile device may read data from the docked-safe zone when the mobile device is in a mobile environment or is in a non-mobile environment; and
the mobile-safe zone has a track pitch that is wider than a track pitch of the docked-safe zone.

11. A mobile device as defined in claim 10, wherein the mobile-safe zone has a track pitch that is wider than a track pitch of the ultra-safe zone.

12. A disk drive for use in a mobile device including a host processor, the disk drive having a rotating disk media and a moveable read/write head disposed over the disk media, the disk media being divisible into zones that are radially disposed in discrete areas of the disk media, each zone having a plurality of tracks for storing data, the disk drive comprising:
a first data storage zone, wherein the mobile device may write data to the first data storage zone when the mobile device is in a mobile environment; and
a second data storage zone, wherein the mobile device may write data to the second data storage zone only when the mobile device is in a non-mobile environment and may not write to the second data storage zone when the mobile device is in a mobile environment.

13. A disk drive as deemed in claim 12, wherein the mobile device is in a non-mobile environment when the mobile device is placed in a docking station and the mobile device is in a mobile environment when the mobile device is not placed in a docking station.

14. A disk drive as defined in claim 12, wherein
the second data storage zone includes an ultra-safe zone and a docked-safe zone;
the mobile device may read data from the ultra-safe zone only when the mobile device is in a non-mobile environment and not when the mobile device is in a mobile environment; and
the mobile device may read data from the docked-safe zone when the mobile device is in a mobile environment or when the mobile device is in a non-mobile environment.

15. A disk drive as defined in claim 14, wherein the disk drive prevents the moveable read/write head from dwelling over the ultra-safe zone when the device is in a mobile environment.

16. A disk drive as defined in claim 14, wherein the disk drive prevents the moveable read/write head from moving over the ultra-safe zone when the device is in a non-mobile environment.

17. A disk drive as defined in claim 12, wherein the first data storage zone includes a mobile-safe zone and a mobile-normal zone, and the mobile-safe zone has a track pitch that is wider than a track pitch of the mobile-normal zone.

18. A disk drive as defined in claim 12, wherein:
  the disk drive includes a ramp for parking an actuator arm coupled to the read/write head when the disk drive is in a spin-down mode; and
  the disk drive includes a mobile-low-power zone that is located on the disk media so that an actuator current is minimized for moving the read/write head to a data track in the mobile-low-power zone upon loading of the read/write head over the disk media from the ramp.

19. A disk drive as defined in claim 18, wherein a distance from an outer diameter of the disk media to the mobile-low-power zone is between about 10 and 15 percent of a distance between the outer diameter and an inner diameter of the disk media.

20. A disk drive for use in a mobile device including a host processor, the disk drive having a rotating disk media and a moveable read/write head disposed over the disk media, the disk media being divisible into zones that are radially disposed in discrete areas of the disk media, each zone having a plurality of tracks for storing data, the disk drive comprising:
  a first data storage zone, wherein the mobile device may write data to the first data storage zone when the mobile device is in a mobile environment, and wherein the first data storage zone includes a mobile-safe zone and a mobile-normal zone, the mobile device may write data to adjacent tracks of the mobile normal zone, and the mobile device may not write data to adjacent tracks of the mobile-safe zone; and
  a second data storage zone, wherein the mobile device may write data to the second data storage zone only when the mobile device is in a non-mobile environment and may not write to the second data storage zone when the mobile device is in a mobile environment.

21. A disk drive for use in a mobile device including a host processor, the disk drive having a rotating disk media and a moveable read/write head disposed over the disk media, the disk media being divisible into zones that are radially deposed in discrete areas of the disk media, each zone having a plurality of tracks for storing data, the disk drive comprising:
  a first data storage zone, wherein the mobile device may write data to the first data storage zone when the mobile device is in a mobile environment; and
  a second data storage zone, wherein the mobile device may write data to the second data storage zone only when the mobile device is in a non-mobile environment and may not write to the second data storage zone when the mobile device is in a mobile environment, wherein:
    the second data storage zone includes an ultra-safe zone and a docked-safe zone, and the first data storage zone includes a mobile-safe zone and a mobile-normal zone;
    the mobile device may read data from the ultra-safe zone only when the mobile device is in a non-mobile environment;
    the mobile device may read data from the docked-safe zone when the mobile device is in a mobile environment or is in a non-mobile environment; and
    the mobile-safe zone has a track pitch that is wider than a track pitch of the docked-safe zone.

22. A disk drive as defined in claim 21, wherein the mobile-safe zone has a track pitch that is wider than a track pitch of the ultra-safe zone.

* * * * *